United States Patent Office 3,144,461
Patented Aug. 11, 1964

3,144,461
13-SUBSTITUTED 5,6-DIHYDRO-13H-DIBENZO-[a,i]CARBAZOLES
Leonard M. Rice, Baltimore, Md., and Meier E. Freed, Philadelphia, and Elisabeth Hertz, Bryn Mawr, Pa., assignors to American Home Products Corporation, New York, N.Y., a corporation of Delaware
No Drawing. Filed Apr. 16, 1962, Ser. No. 187,940
7 Claims. (Cl. 260—315)

This invention relates to novel N-substituted dihydrodibenzocarbazole compounds. More particularly, it relates to bases having the formula

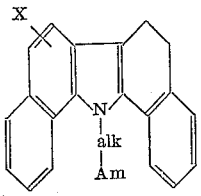

where X represents hydrogen, halogen, methyl, trifluoromethyl, or lower alkoxy, alk is a bivalent alkylene radical of from two to six carbon atoms and may be either straight-chained or branched, and Am represents an amino radical of no more than about eight carbon atoms which may be a primary amino radical, or an amino radical substituted by one or two lower alkyl or hydroxy lower alkyl radicals, and to the non-toxic salts of such bases with pharmaceutically acceptable acids. As representative of such pharmaceutically acceptable acids may be mentioned hydrochloric, hydrobromic, sulfuric, phosphoric, citric, malic, maleic, fumaric, succinic, acetic, and propionic acids.

The compounds of this invention, ordinarily in the form of the said salts of pharmaceutically acceptable acids, are useful because of their valuable pharmacological properties. They are analgesic agents and serve to lower blood pressure. They are, accordingly, of value in both human and veterinary medicine. Compounded or combined with suitable solvents, diluents, buffering agents, carriers, etc., they may be administered orally or parenterally.

As starting materials for the preparation of the new compounds of this invention it is convenient to employ 5,6-dihydro-13H-dibenzo[a,i]carbazole compounds having the formula

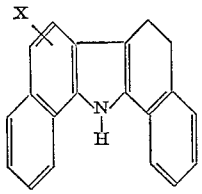

where X represents hydrogen, halogen, methyl, trifluoromethyl, or lower alkoxy. A convenient method involves converting such compounds to their 13-sodio derivatives by reaction with sodium hydride and then reacting this with a suitable aminoalkyl halide. Among amino alkyl halides suitable for employment in this synthesis may be mentioned 3-dimethylaminopropyl chloride, 2-dimethylaminoethyl chloride, 3-dimethylaminopropyl bromide, 6-dimethylaminohexyl chloride, and 3-dimethylaminoisobutyl chloride.

An alternative method of preparing the bases of this invention comprises reacting an alkylene dihalide (e.g., ethylene dichloride, trimethylene chlorobromide, tetramethylene dibromide, etc.) with the 13-sodio-5,6-dihydro-13H-dibenzo[a,i]carbazole to obtain a 13-(ω-haloalkyl)-5,6-dihydro-13H-dibenzo[a,i]carbazole and then reacting this with ammonia or a primary or secondary amine.

A convenient route to compounds of the invention where alk represents a trimethylene radical or a 2-methyltrimethylene radical comprises reacting a 5,6-dihydro-13H-dibenzo[a,i]carbazole with acrylonitrile or methacrylonitrile to yield a 13-(β-cyanoethyl)-5,6-dihydro-13H-dibenzo[a,i]carbazole; if a 13-(3-aminopropyl)-5,6-dihydro-13H-dibenzo[a,i]carbazole is desired, this can be obtained by suitable reduction of the β-cyanoethyl group to a 3-aminopropyl radical. If a 13-(3-alkylaminopropyl) or a 13-(-3-dialkylaminopropyl) derivative is desired, the 13-(β-cyanoethyl) compound may be converted to a 13-(β-carbethoxyethyl) compound by the usual treatment with alcoholic hydrogen chloride; amidation of the ester with a suitable monoalkylamine or dialkylamine yields an amide which is easily reduced by lithium aluminum hydride to the desired 13-(3-alkylamino or 13-(3-dialkylamino) compound.

The following examples illustrate the preparation of our novel compounds.

*Example 1*

A solution of 6.74 g. of 5,6-dihydro-13H-dibenzo[a,i]carbazole in 35 ml. of dimethylformamide is added slowly to a well stirred suspension of 1.6 g. of sodium hydride in 10 ml. of dimethylformamide. The mixture is stirred at 30–35° C. for 1½ hours until hydrogen is no longer evolved. The mixture is cooled to 10° C. and 3.7 g. of freshly distilled 3-dimethylaminopropyl chloride is added. The mixture is stirred and heated at about 50° C. for two hours, and then poured into 150 ml. of ice-water. The water-quenched reaction mixture is brought to pH 1 by addition of about 10 ml. of concentrated hydrochloric acid, and extracted with 225 ml. of ether in three portions. The aqueous phase is then made strongly alkaline with 40% sodium hydroxide and extratced with 300 ml. of ether in four portions. This ether extract is washed with saturated sodium chloride solution and dried over anhydrous magnesium sulfate. The solvent is evaporated, leaving a residue of 13-(3-dimethylaminopropyl)-5,6-dihydro-13H-dibenzo[a,i]carbazole which, after recrystallization from aqueous alcohol melts at 85–87° C.

Analysis:

|  | C | H | N |
|---|---|---|---|
| Calculated for $C_{25}H_{26}N_2$ | 84.70 | 7.39 | 7.91 |
| Found | 84.47 | 7.30 | 7.90 |

This base (8.4 g.), dissolved in a little acetone, is added to a solution of 2.75 g. of fumaric acid in 300 ml. of boiling acetone. The fumarate salt precipitates and is removed by filtration. After recrystallization from methanol-acetone, it melts at 172–175° C.

Analysis:

|  | C | H | N |
|---|---|---|---|
| Calculated for $C_{29}H_{30}N_2O_4$ | 74.02 | 6.43 | 5.95 |
| Found | 73.72 | 6.29 | 5.92 |

*Examples 2–7*

By the general procedure of Example 1 there are made:
(2) 13 - (2 - dimethylaminoethyl) - 5,6 - dihydro - 13H-dibenzo[a,i]carbazole from 5,6-dihydro-13H-dibenzo[a,i]carbazole and 2-dimethylaminoethyl chloride;
(3) 8 - trifluoromethyl - 13 - (3 - dimethylaminopropyl)-5,6-dihydro-13H-dibenzo[a,i]carbazole from 8-trifluoromethyl - 5,6 - dihydro - 13H - dibenzo[a,i]carbazole and 3-dimethylaminopropyl chloride;

(4) 13 - (6 - dimethylaminohexyl) - 5,6 - dihydro - 13H - dibenzo[a,i]carbazole from 5,6 - dihydro - 13H - dibenzo[a,i]carbazole and 6-dimethylaminohexyl chloride;

(5) 13 - (3 - pyrrolidinopropyl) - 5,6 - dihydro - 13H-dibenzo[a,i]carbazole from 5,6 - dihydro - 13H - dibenzo[a,i]carbazole and 3-pyrrolidinopropyl chloride;

(6) 13 - (3 - piperazinopropyl) - 5,6 - dihydro - 13H-dibenzo[a,i]carbazole from 5,6 - dihydro - 13H - dibenzo[a,i]carbazole and 3-piperazinopropyl chloride;

(7) 13 - (3 - dimethylamino - 2 - methylpropyl) - 5,6-dihydro - 13H - dibenzo[a,i]carbazole from 5,6 - dihydro - 13H-dibenzo[a,i]carbazole and 3-dimethylaminoisobutyl chloride.

*Example 8*

13 - [3 - (4 - hydroxyethylpiperazino)propyl] - 5,6-dihydro-13H-dibenzo[a,i]carbazole is prepared by treatment of 13 - (3 - piperazinopropyl) - 5,6 - dihydro - 13H - dibenzo[a,i]carbazole with an equimolar quantity of ethylene oxide in the presence of a basic catalyst.

*Example 9*

13 - (3 - aminopropyl) - 5,6 - dihydro - 13H - dibenzo[a,i]carbazole is prepared in two reaction steps by first preparing 13 - (2 - cyanoethyl) - 5,6 - dihydro - 13H-dibenzo[a,i]carbazole by addition of acrylonitrile to 5,6-dihydro-13H-dibenzo[a,i]carbazole under the influence of a catalytic amount of benzyltrimethylammonium hydroxide, and then reducing the nitrile with lithium aluminum hydride.

*Example 10*

13 - (3 - methylaminopropyl) - 5,6 - dihydro - 13H - dibenzo[a,i]carbazole is prepared by a four-reaction process as follows: 13-(2-cyanoethyl)-5,6-dihydro-13H-dibenzo[a,i]carbazole is prepared as outlined in Example 9 and treated with alcoholic hydrogen chloride to form 13 - (2 - carboethoxyethyl) - 5,6 - dihydro - 13H-dibenzo[a,i]carbazole; treatment of the latter with alcoholic methylamine yields 13-(2-carbomethamidoethyl)- 5,6-dihydro-13H-dibenzo[a,i]carbazole which may be reduced with lithium aluminum hydride to yield the desired 13 - (3 - methylaminopropyl) - 5,6 - dihydro - 13H - dibenzo[a,i]carbazole.

We claim:

1. A substance selected from the group consisting of bases having the formula

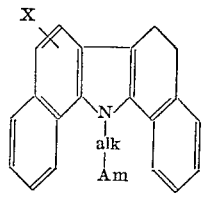

where X is a member of the group consisting of hydrogen, halogen, methyl, trifluoromethyl, and lower alkoxy, alk is alkylene of from two to six carbon atoms, and Am represents an amino radical selected from the group consisting of diloweralkylamino, pyrrolidino, piperazino, hydroxy lower alkyl piperazino, amino, and lower alkylamino, and the non-toxic salts of said bases with pharmaceutically acceptable acids.

2. 13 - (3 - dimethylaminopropyl) - 5,6 - dihydro - 13H-dibenzo[a,i]carbazole.

3. A compound according to claim 1 wherein the bivalent alkylene radical represented by alk consists of three carbon atoms.

4. A compound according to claim 1 wherein X is hydrogen and the amino group represented by Am is a dialkylamino group.

5. A compound according to claim 1 wherein X is hydrogen and the amino group represented by Am is a dimethylamino group.

6. 13 - (3 - pyrrolidinopropyl) - 5,6 - dihydro - 13H-dibenzo[a,i]carbazole.

7. 13 - (3 - methylaminopropyl) - 5,6 - dihydro - 13H-dibenzo[a,i]carbazole.

No references cited.